United States Patent
Cadigan, Jr. et al.

(10) Patent No.: US 7,843,919 B2
(45) Date of Patent: Nov. 30, 2010

(54) ETHERNET VIRTUALIZATION USING A NETWORK PACKET ALTERATION

(75) Inventors: Michael J. Cadigan, Jr., Brewster, NY (US); Joel Goldman, Port Ewen, NY (US); Howard M. Haynie, Wappingers Falls, NY (US); Bruce H. Ratcliff, Red Hook, NY (US); Jeffrey M. Turner, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 134 days.

(21) Appl. No.: 12/052,320

(22) Filed: Mar. 20, 2008

(65) Prior Publication Data
US 2009/0238190 A1 Sep. 24, 2009

(51) Int. Cl.
*H04L 12/28* (2006.01)
(52) U.S. Cl. ...................................................... 370/389
(58) Field of Classification Search ........................ None
See application file for complete search history.

(56) References Cited

U.S. PATENT DOCUMENTS

| | | | |
|---|---|---|---|
| 5,337,313 A * | 8/1994 | Buchholz et al. | 370/394 |
| 5,583,862 A * | 12/1996 | Callon | 370/397 |
| 5,920,559 A * | 7/1999 | Awaji | 370/392 |
| 6,032,190 A * | 2/2000 | Bremer et al. | 709/238 |
| 6,163,539 A * | 12/2000 | Alexander et al. | 370/392 |
| 6,205,122 B1 * | 3/2001 | Sharon et al. | 370/254 |
| 6,427,169 B1 * | 7/2002 | Elzur | 709/224 |
| 6,577,627 B1 * | 6/2003 | Driscoll et al. | 370/389 |
| 6,724,761 B1 * | 4/2004 | Moy-Yee et al. | 370/390 |
| 6,728,909 B1 * | 4/2004 | Bunton et al. | 714/49 |
| 6,973,026 B1 * | 12/2005 | Dyrga et al. | 370/218 |
| 7,289,497 B2 * | 10/2007 | Pelletier et al. | 370/389 |
| 2002/0071398 A1 * | 6/2002 | Moran et al. | 370/252 |
| 2003/0046387 A1 * | 3/2003 | Oshima et al. | 709/224 |
| 2004/0202169 A1 * | 10/2004 | Mukouyama et al. | 370/395.1 |
| 2007/0133541 A1 * | 6/2007 | Jung et al. | 370/392 |
| 2007/0174668 A1 * | 7/2007 | Srinivasan | 714/6 |
| 2007/0273762 A1 * | 11/2007 | Steensma et al. | 348/143 |
| 2008/0243947 A1 * | 10/2008 | Kaneda | 707/203 |
| 2009/0092043 A1 * | 4/2009 | Lapuh et al. | 370/228 |
| 2009/0092136 A1 * | 4/2009 | Nazareth et al. | 370/392 |
| 2010/0061393 A1 * | 3/2010 | Wong | 370/419 |

* cited by examiner

*Primary Examiner*—Pankaj Kumar
*Assistant Examiner*—Hicham B. Foud
(74) *Attorney, Agent, or Firm*—Steven Chiu

(57) ABSTRACT

A method of Ethernet virtualization using network packet alteration. The method comprises receiving network packets from a host destined for transmission over a network, checking whether the network packets have headers, if the packets do not have headers, forming a first portion of the header using firmware, storing the formed packet and header to a first memory; and forming a second portion of the header using programmable logic.

16 Claims, 10 Drawing Sheets

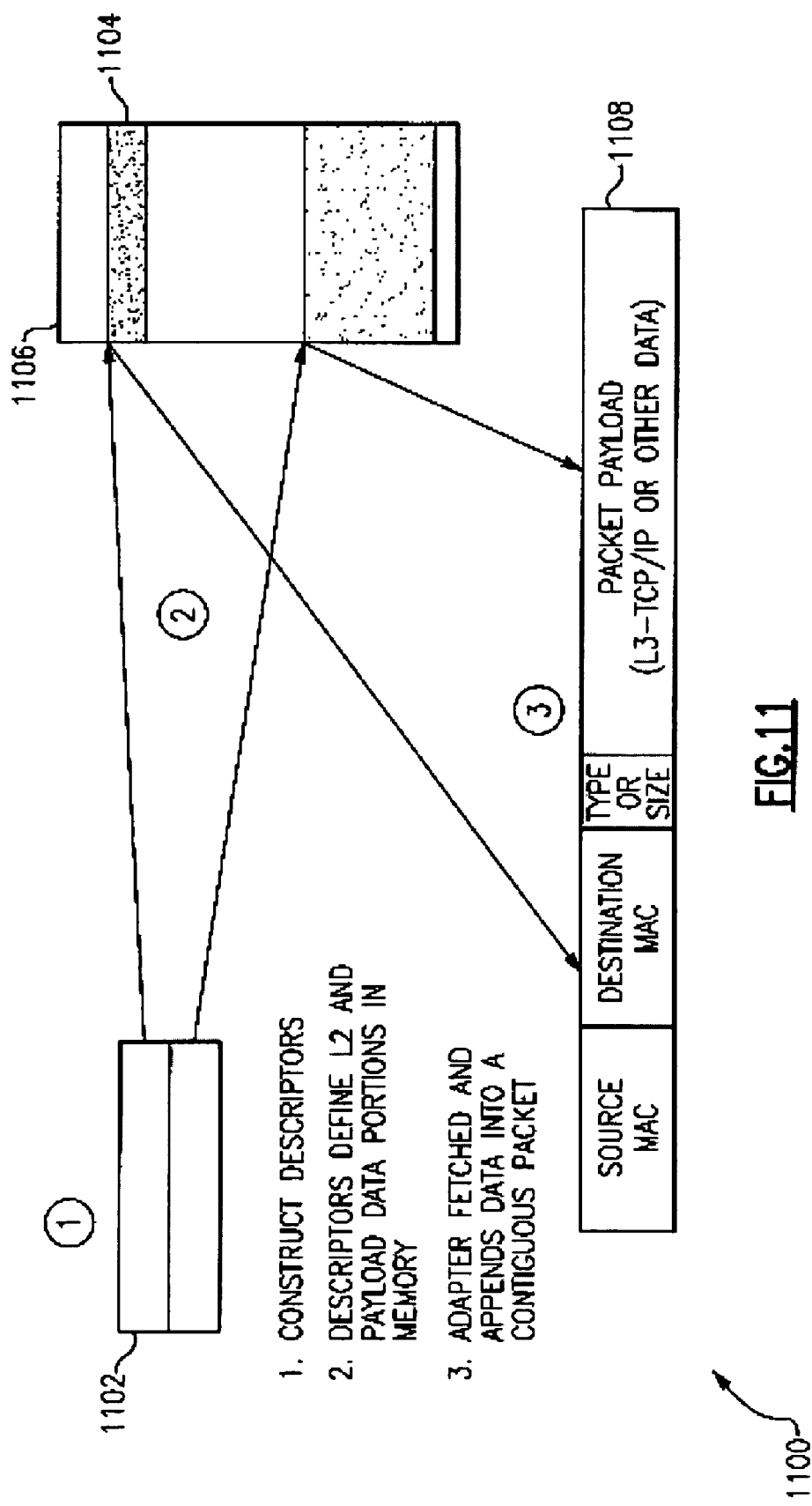

US 7,843,919 B2

ETHERNET VIRTUALIZATION USING A NETWORK PACKET ALTERATION

BACKGROUND OF THE INVENTION

This invention relates generally to network virtualization and, more particularly, to methods, systems, computer program products, and hardware products for implementing Ethernet virtualization routers using a flexible means to modify network packets.

A shortcoming with existing network virtualization techniques is that they route packets to virtual hosts based on the network packet headers.

BRIEF SUMMARY OF THE INVENTION

In one embodiment, the present application provides improved efficiency by modifying network packet headers for various routing and offload functions. These techniques provide advantageous by using an enhanced technique for Ethernet virtualization that overcomes the foregoing deficiencies by automated on-the-fly alteration of network packet data.

Exemplary embodiments include a method for Ethernet virtualization using network packet alternation. The method comprises receiving network packets from a host destined for transmission over a network, checking whether the network packets have headers, if the packets do not have headers, forming a first portion of the header using firmware, storing the formed packet and header to a first memory; and forming a second portion of the header using programmable logic.

A system and a computer program product corresponding to the above-summarized method is also described and claimed herein. Other systems, methods, computer program products according to embodiments will be or become apparent to one with skill in the art upon review of the following drawings and detailed description. It is intended that all such additional systems, methods, computer program products, and/or hardware products be included within this description, be within the scope of the present invention, and be protected by the accompanying claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

Referring now to the drawings wherein like elements are numbered alike in the several FIGURES:

FIG. 11 is a block diagram illustrating assembly of the network packet after alteration.

The detailed description explains the preferred embodiments of the invention, together with advantages and features, by way of example with reference to the drawings.

DETAILED DESCRIPTION OF EXEMPLARY EMBODIMENTS

An exemplary embodiment of the present invention permits a hardware Ethernet virtualization router which serves a large number of communications channels to maintain high bandwidth by ensuring that packets can continue moving. The router avoids having to place back pressure on the network or having to drop packets, which are undesirable alternatives to moving packets. Thus, the technical effects and benefits include allowing an Ethernet virtualization router servicing any number of communications channels to continually move traffic efficiently regardless of packet types or shortages in channel-specific resources. High bandwidth can be maintained in spite of the unpredictable and bursty traffic patterns inherent to Ethernet networks. Packet order is maintained on a host-by-host basis and does not stall the flow of packets to one virtual machine because of a shortage of resources required for another virtual machine. Packets requiring special attention, such as multicast packets, packets for which connections cannot be determined by a parser, or address resolution protocol (ARP) packets, may also be handled using the methods disclosed herein.

Figure 1A:
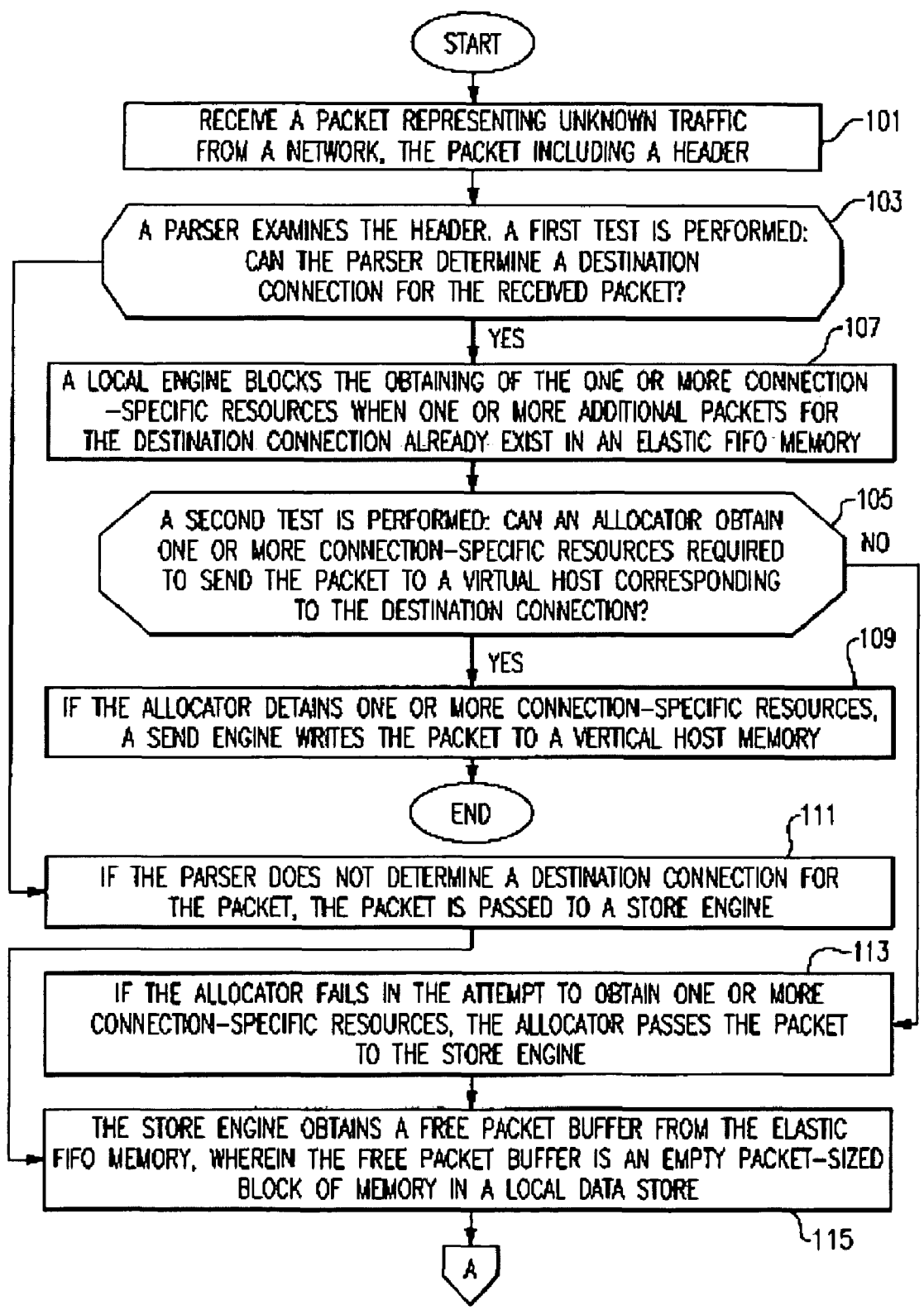
FIGS. 1A and 1B together comprise a flowchart setting forth an illustrative operational sequence for Ethernet virtualization to facilitate flow of unknown traffic to a virtual host.
Figure 1B:
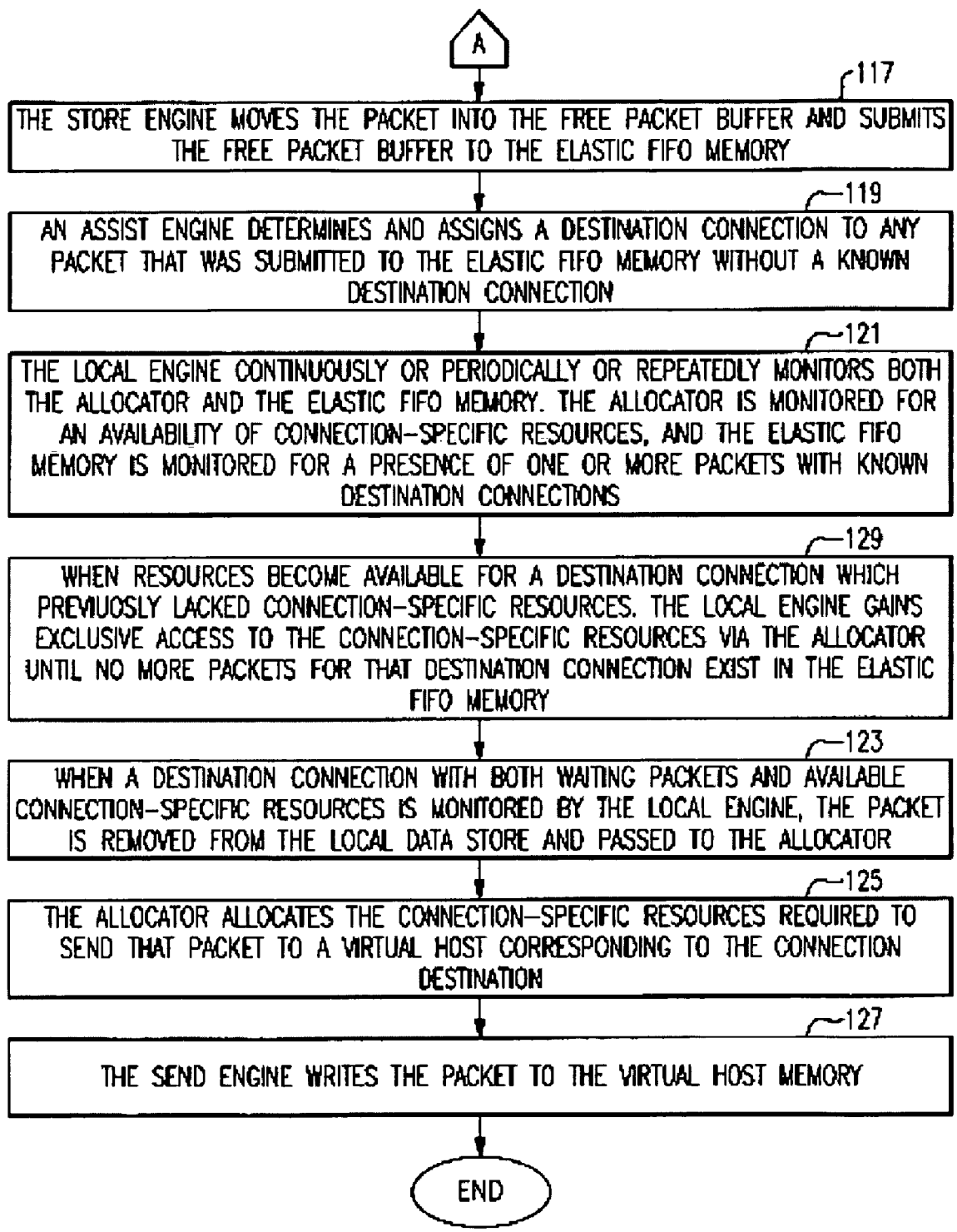
Figure 2:
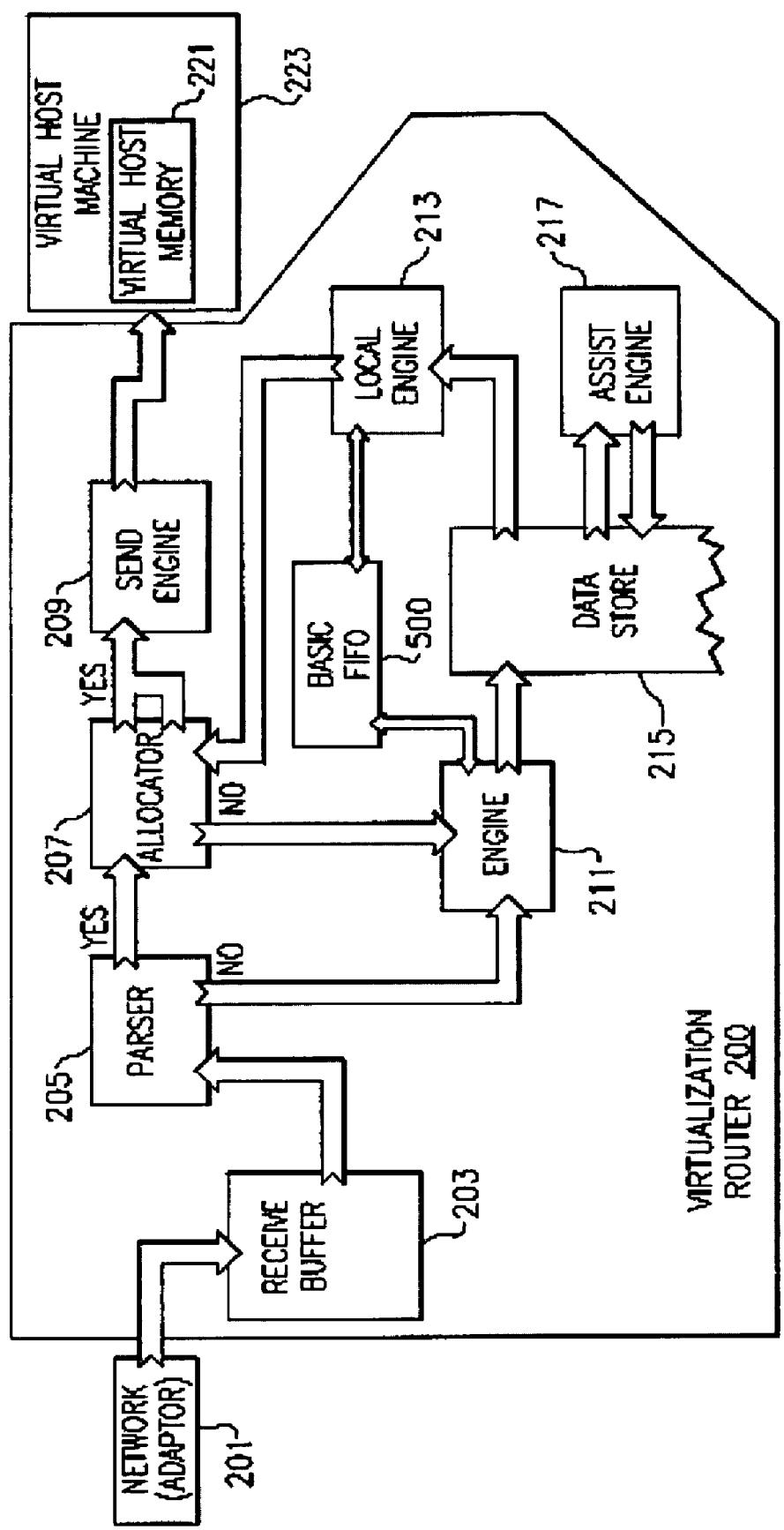
FIG. 2 is a block diagram setting forth an illustrative system for Ethernet virtualization to facilitate flow of unknown traffic to a virtual host.

FIGS. 1A and 1B together comprise a flowchart setting forth an illustrative operational sequence for Ethernet virtualization to facilitate flow of unknown traffic to a virtual host, and FIG. 2 is a block diagram setting forth an illustrative system for Ethernet virtualization using an elastic FIFO memory to facilitate flow of unknown traffic to a virtual host. Although FIGS. 1A and 1B show a linearly sequential series of operations, this is solely for purposes of clarity and illustration, as some of the steps could be performed in parallel or in a sequence other than what is shown in FIGS. 1A and 1B. The operational sequence of FIGS. 1A and 1B commences at block 101 (FIG. 1A) where a packet is received that represents unknown traffic destined for a virtual host. The packet is received from a network. The received packet includes a header. Illustratively, the received packet may be written into a relatively small optional receive buffer 203 (FIG. 2) as the packet arrives from a network adapter 201. The receive buffer 203 is not strictly required.

At block 103 (FIG. 1A), a parser 205 (FIG. 2) examines each packet's headers (for example, layer 2, layer 3, etc.) and a first test is performed to ascertain whether or not a destination connection can be determined for the received packet. The affirmative branch from block 103 leads to block 107, and the negative branch from block 103 leads to block 111 (described in greater detail hereinafter). If the parser 205 (FIG. 2) can determine a destination connection for the packet, following block 107 at block 105 (FIG. 1A), a second test is performed to ascertain whether or not one or more connection-specific resources required to send the packet to a virtual host memory corresponding to the destination connection are available. The one or more connection-specific resources are available if they can be obtained for allocation by a resource allocation mechanism such as an allocator 207 (FIG. 2). For example, the allocator 207 attempts to obtain one or more connection-specific resources required to send that packet to a virtual machine 223 that corresponds to the destination connection. Note that the terms "virtual machine" and "virtual host" are used interchangeably herein. The affirmative branch from block 105 leads to block 109 (to be described in greater detail hereinafter), whereas the negative branch from block 105 leads to block 113 (to be described in greater detail hereinafter).

Although the illustrative configuration of FIG. 2 shows one virtual machine 223, this is for purposes of clarity, as the system of FIG. 2 may contain a plurality of virtual machines. For example, a practical system may include hundreds or thousands of virtual machines. With hundreds or thousands of virtual machines running on a single physical host, there may be scattered shortages of resources for some small subset of the virtual machines at any given time. Within the physical machine, a hypervisor may allocate differing resources to different virtual machines. For example, some virtual machines may have higher priority and therefore get more time-slices than others. Or, some virtual machines may have more physical storage allocated for use as receive buffers. A real-world system hosting thousands of virtual machines may not operate perfectly at all times with regard to resource management. Likewise, scattered resource shortages may be attributed to the inherently bursty nature of Ethernet traffic.

At block 107 (FIG. 1A), a local engine 213 (FIG. 2) blocks the allocator 207 from allocating resources to new packets when packets for the same connection already exist within an elastic first-in, first-out (FIFO) 500 memory because of a previous lack of resources. At block 109 (FIG. 1A), if the allocator 207 is successful in obtaining the resources, a send engine 209 (FIG. 2) writes the packet to a virtual host memory 221 associated with the virtual machine 223. If the parser 205 does not determine the packet's connection (FIG. 1A, block 111), it passes the packet to a store engine 211 (FIG. 2). At block 113 (FIG. 1A), if the allocator 207 (FIG. 2) fails in its attempt to obtain the required resources (which could be because the resources are not available or because the local engine currently has priority access to those resources), the allocator 207 passes the packet to the store engine 211.

Next, at block 115 (FIG. 1A), for each packet it is to service, the store engine 211 (FIG. 2) obtains a free packet buffer from the elastic FIFO 500. A free packet buffer is an empty packet-sized block of memory in a local data store 215. The store engine 211 moves the packet into that buffer (FIG. 1B, block 117) and submits the used buffer to the elastic FIFO 500 (FIG. 2). If a free packet buffer resource is not available, the packet is dropped or, optionally, the store engine 211 can wait for that shared resource to become available provided sufficient buffering, such as the receive buffer, is available. Since a packet's connection must be determined before it can be sent to the virtual host memory 221, at block 119 (FIG. 1B) an assist engine 217 (FIG. 2) determines and assigns connections to packets that were submitted to the elastic FIFO 500 without known connections (i.e. those packets which arrived from the parser 205).

The procedure of FIGS. 1A and 1B progresses to block 121 (FIG. 1B) where the local engine 213 (FIG. 2) continuously or periodically or repeatedly monitors both the allocator 207 for connection-specific resources and the elastic FIFO 500 for the presence of packets with known destination connections. When resources become available for a connection which had previously lacked resources, block 129, the local engine 213 (FIG. 2) gains exclusive access to those resources, via the allocator 207, until no more packets for that connection exist in the elastic FIFO 500. The operations of block 129 (FIG. 1B) are critical to maintaining packet order within destination connections. At block 123 (FIG. 1B), when a connection with both waiting packets and available resources is seen, the packet is removed from the local data store 215 (FIG. 2) and passed to the allocator 207. The allocator 207 allocates the connection-specific resources required to send that packet to a virtual machine 223 corresponding to the connection destination (FIG. 1B, block 125). Since the local engine 213 (FIG. 2) already determined that the resources were available and claimed them for the packet, the allocator 207 is successful and the packet is written to virtual host memory 221 by the send engine 209 at block 127 (FIG. 1B).

The parser 205 (FIG. 2), allocator 207, send engine 209, store engine 211, local engine 213, local data store 215, elastic FIFO 500, and assist engine 217 together comprise a virtualization router 200. The router 200 is referred to as a virtualization router because it supports communication channels to a plurality of virtual machines which are called destination connections, such as virtual machine 223, providing the illusion to each virtual machine 223 that it possesses its own network interface card (such as the network adapter 201), when in fact only a single high-speed adapter (i.e., the network adapter 201) is present. The network adapter 201 is run in promiscuous mode to receive all packets off the network. The router 200 determines the correct connection for each packet and moves the packet to a memory space (i.e., virtual host memory 221) of a corresponding virtual machine 223.

Inbound Ethernet traffic flow is inherently bursty. Multiple shared and non-shared resources are required for each connection in order to move its packets. With inherently limited resources which must be carefully managed, one of the functions performed by the router 200 is to handle the bursty traffic in such a way as to minimize packet loss and retransmission for each connection in the context of virtual hosts, thereby maximizing network efficiency.

Figure 3:
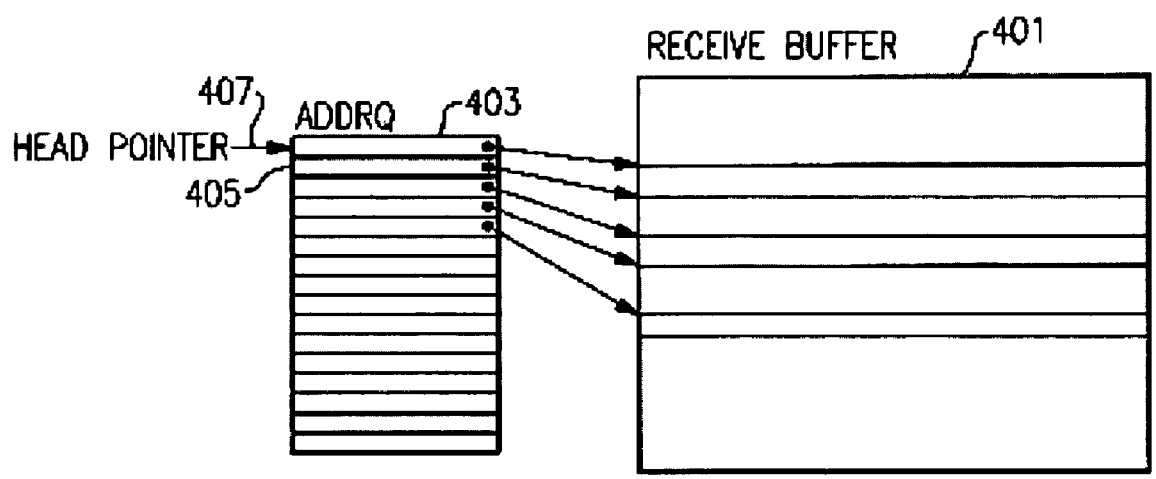
FIG. 3 is a data structure diagram setting forth an illustrative receive buffer for use with the system of FIG. 2.

FIG. 3 is a data structure diagram setting forth an illustrative receive buffer 401 for implementing the optional receive buffer 203 of FIG. 2. Incoming bursts of packet data are initially written directly into the receive buffer 401 (FIG. 3), which is managed with a queue of records called an addrq 403. Each record 405 contains various information about a burst including a pointer into the receive buffer 401 where the data was written. All packets are removed from the receive buffer 401 in the same order that they were previously written (as the packets arrived from the network adapter 201, FIG. 2). If the packet at the head of the addrq 403 (FIG. 3) as indicated by a head pointer 407 is not a type of packet that requires special handling and if all required resources are available to move the packet, the packet is sent directly to its connection destination (virtual host memory 221, FIG. 2). Otherwise, if the packet is a special type or if one or more of the resources is not available, the packet is sent to the elastic FIFO 500.

As the head pointer 407 (FIG. 3) moves forward (i.e., in a downward direction wherein FIG. 3 is oriented such that the reference numerals are upright), packets for connections with ample resources continue to be sent directly to their connection destinations even while packets for other connections without resources are sent to the elastic FIFO 500 (FIG. 2). Similarly, by the same mechanism, packets that do not require special consideration can be sent directly to their destinations while packets that require extra processing (e.g. multicast packets) can be sent to the elastic FIFO 500 to be serviced by an independently-running assist engine. In this way, the flow of all packets continues through the router 200 consistently without stalls or hesitations.

Figure 4:
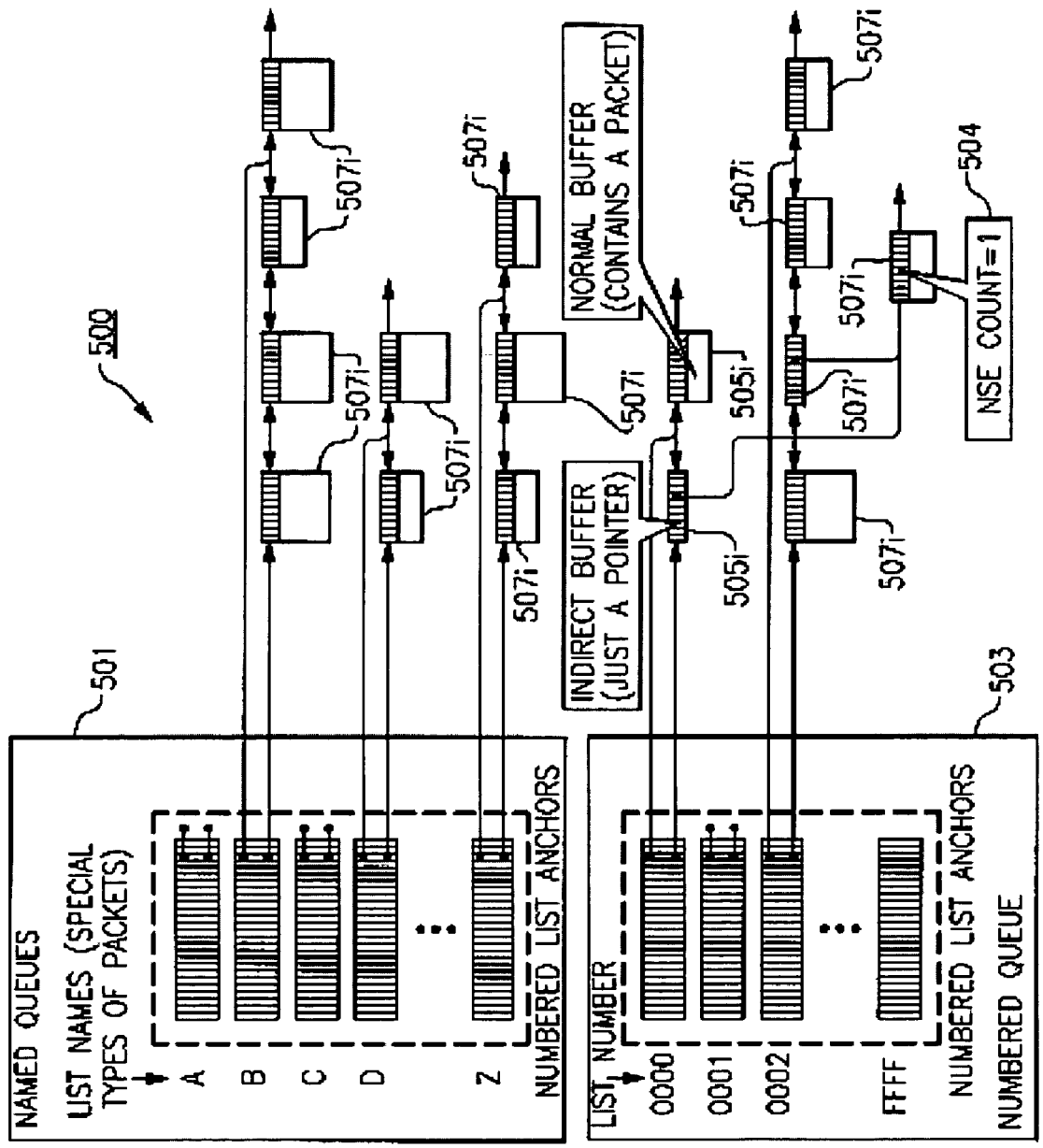
FIG. 4 is a data structure diagram setting forth an illustrative elastic FIFO for use with the system of FIG. 2.

FIG. 4 is a data structure diagram setting forth an illustrative elastic FIFO 500 memory (FIGS. 2 and 4) for use with the system of FIG. 2 and the method of FIG. 1. The elastic FIFO 500 (FIG. 4) includes a large array of linked lists of packet buffers, as well as all the functionality required to maintain those lists and allow them to be put to a useful purpose. The elastic FIFO 500 serves to manage the flow of packets that can not be sent directly from the receive buffer 203 (FIG. 2) to one of the virtual machines such as the virtual machine 223. The elastic FIFO 500 (FIG. 4) is called "elastic" because it changes shape with changes in either or both of: (a) the number of active connections, or (b) the total number of packets contained by the FIFO. In its entirety, the memory footprint of the elastic FIFO 500 can be increased or decreased over time as free buffers are dynamically added or removed.

The elastic FIFO 500 is also called "elastic" because it is actually a collection of queues on which packet buffers and pointers to packet buffers are held. These pointers to packet buffers are shown in FIG. 4 as indirect buffers 505.i, where i is any positive integer greater than zero. The packet buffers are shown in FIG. 4 as normal buffers 507.j where j is any positive integer greater than zero. There are named queues 501 for free normal buffers 507.j of various sizes. These named queues 501 also include a named queue for free indirect buffers 505.i. Indirect buffers 505.i only occupy a small amount of memory, as they merely point to a normal buffer 507.j, but these indirect buffers 505.i do occupy some memory and are thus obtained as needed from the free list so that they may be enqueued to a numbered list. Since the elastic FIFO 500 is elastic, additional free indirect buffers 505.i can be added as necessary, and these buffers may also be taken away if the free list becomes excessively long. There is no direct relationship between the total number of indirect buffers 505.i and normal buffers 507.j. At any given time, some number of the normal buffers 507.j will be occupied by packets, though ideally most should be free most of the time.

There are two categories of queues within the elastic FIFO 500: named queues 501 and numbered queues 503. When a packet is sent to the elastic FIFO 500 because it requires special consideration, it is placed on a named queue of named queues 501, as opposed to being placed on a numbered connection queue of numbered queues 503. Each named queue of named queues 501 includes a list name A, B, C, D, Z that reflects a special packet type placed on that queue. Packets placed on named queues 501 must ultimately be moved to numbered queues 503. Packets on a numbered queue of numbered queues 503 can be sent to a corresponding destination connection's virtual host memory 221 (FIG. 2) as soon as the required connection-specific resources are available.

Named queues 501 (FIG. 4) are also used for implementing pools of various types of free buffers, which are buffers that are not currently associated with a packet. A free buffer is obtained for each packet that is to be locally stored, and that buffer is returned to the pool from which it originated once the packet has been removed from local storage and sent to virtual host memory 221 (FIG. 2). When the special packet type is multicast or broadcast, the packet must be moved from a "multicast" or "broadcast" named queue of named queues 501 (FIG. 4) to a plurality of numbered queues in numbered queues 503 so it may be sent to multiple virtual machines including virtual machine 223 (FIG. 2), wherein potentially thousands of such virtual machines are present. The assist engine 217 efficiently performs this task through the use of indirect buffers 505.i (FIG. 4).

There are two types of packet buffers that may be put on a numbered queue of numbered queues 503: normal buffers 507.j and indirect buffers 505.i. Indirect buffers 505.i do not contain data themselves, but merely point to a normal buffer 507.j. The assist engine 217 (FIG. 2) removes a normal buffer 507.j (FIG. 4) from a named queue of named queues 501, obtains multiple free indirect buffers 505.i from the elastic FIFO 500, points those indirect buffers 505.i at the normal buffer 507.j, and enqueues those indirect buffers 505.i to the appropriate numbered queues 503.

Every normal buffer 507.j carries a use count 509. A normal buffer's use count 509 is usually 1 but can be higher when the normal buffer 507.j is the target of an indirect buffer 505.i. A normal buffer 507.j that is directly sitting on a queue has a use count of 1, while a normal buffer 507.j pointed to by one or more indirect buffers 505.i (which are sitting on one or more queues) has a use count equal to the number of indirect buffers 505.i pointing to it. A normal buffer 507.j that is the target of an indirect buffer 505.i can not itself directly exist on any queue. Each time a copy of the packet in the normal buffer 507.j is sent to virtual host memory 221 (FIG. 2), an indirect buffer 505.i (FIG. 4) pointing to it is removed from a numbered queue of numbered queues 503 and the normal buffer's use count 509 is decremented by 1 (provided it is still greater than 1). When the normal buffer's use count 509 reaches 1, it is returned to the pool of free normal buffers 507.j at the same time a final indirect buffer 505.i pointing to the normal buffer 507.j is dequeued and returned to the pool of free indirect buffers 505.i.

The local engine 213 (FIG. 2) performs the task of dequeuing buffers from the numbered queues 503 (FIG. 4), via the interface provided by the elastic FIFO 500, so the packets contained within or pointed to by those buffers can be sent to virtual host memory 221 (FIG. 2). As soon as the allocator 207 fails to obtain virtual host memory 221 for one packet for a given connection, it must send all subsequent packets for that connection to the local data store 215 in order to maintain packet order for that connection. One task performed by the local engine 213 is to empty queues containing packets that have accumulated, due to resource shortages, so packets may once again flow directly from the network adapter 201 to virtual host memory 221, i.e. without being stored first. The local engine 213 obtains exclusive access to connection-specific resources until the local engine determines that it has emptied a destination connection's queue and relinquishes that exclusivity.

Figure 5:
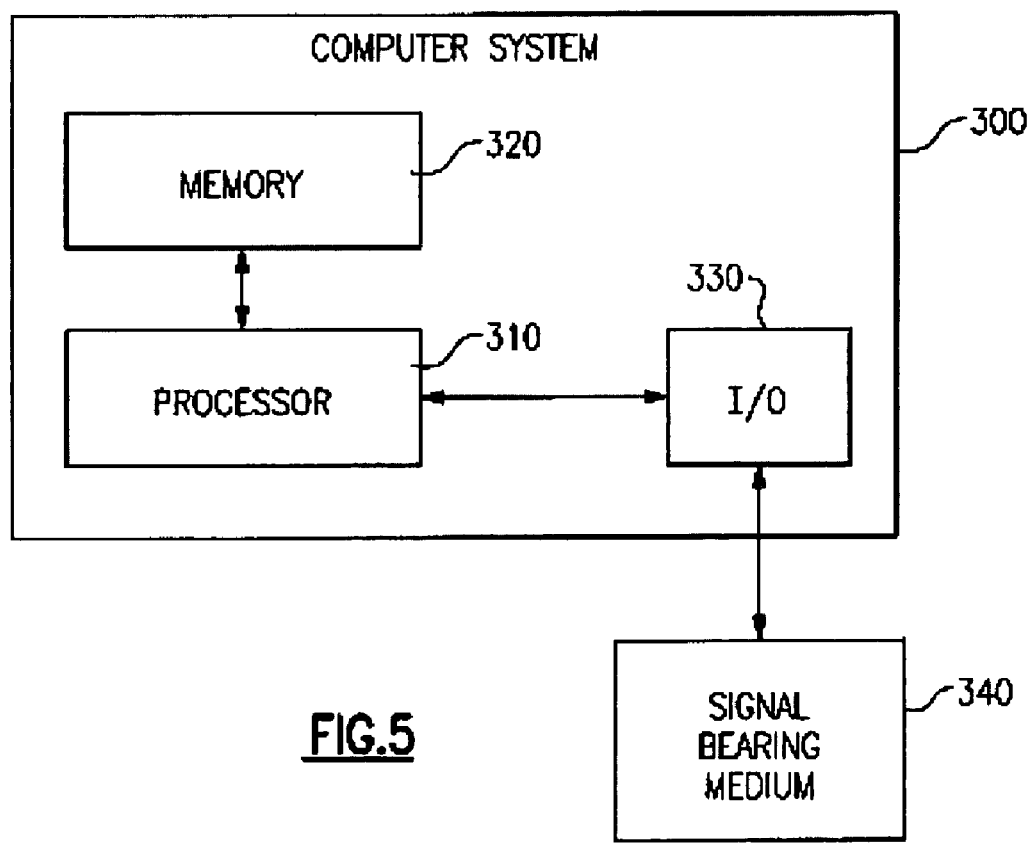
FIG. 5 is a block diagram setting forth an illustrative computer program product or hardware product for Ethernet virtualization to facilitate flow of unknown traffic to a virtual host.

FIG. 5 is a block diagram setting forth an illustrative computer program product or hardware product for Ethernet virtualization using an elastic FIFO memory to facilitate flow of unknown traffic to a virtual host. The system includes a computer 300 operatively coupled to a signal bearing medium 340 via an input/output interface (I/O) 330. The signal bearing medium 340 may include a representation of instructions for Ethernet virtualization using an elastic FIFO memory to facilitate flow of unknown traffic to a virtual host, and may be implemented as, e.g., information permanently stored on non-writeable storage media (e.g., read-only memory devices within a computer, such as CD-ROM disks readable by a CD-ROM drive), alterable information stored on a writeable storage media (e.g., floppy disks within a diskette drive or hard disk drive), information conveyed to a computer by a communications medium, such as through a computer or telephone network, including wireless or broadband communications networks, such as the Internet, etc.

The computer 300 includes a processor 310 that processes information for Ethernet virtualization using an elastic FIFO memory to facilitate flow of unknown traffic to a virtual host, wherein the information is represented, e.g., on the signal bearing medium 340 and communicated to the computer 300 via the I/O 330, wherein the processor 310 saves information as appropriate into a memory 320. Illustratively, the processor 310 corresponds to the processing mechanism 106 of FIG. 1. Returning now to FIG. 6, this information may also be saved into the memory 320, e.g., via communication with the I/O 330 and the signal bearing medium 340.

The processor 310 executes a program for implementing Ethernet virtualization to facilitate flow of unknown traffic to a virtual host. The processor 310 implements instructions for receiving a packet that represents unknown traffic destined for a virtual host on a network; performing a first test to ascertain whether or not a destination connection can be determined for the received packet wherein, if a destination connection can be determined, a second test is performed to ascertain whether or not one or more connection-specific resources required to send the packet to a virtual host memory corresponding to the destination connection are available; if a destination connection for the packet cannot be determined, passing the packet to a store engine; if the one or more connection-specific resources are not available, passing the packet to the store engine; the store engine obtaining a free packet buffer from an elastic first-in, first-out (FIFO) memory, wherein the free packet buffer is an empty packet-sized block of memory in a local data store; the store engine moving the packet into the free packet buffer and submitting the free packet buffer to the elastic FIFO memory; performing a monitoring procedure to detect both an availability of connection-specific resources and a presence of one or more waiting packets with a known destination connection; when a destination connection with: (i) one or more waiting packets, and (ii) available connection-specific resources; are both detected, removing the packet from the local data store; allocating the one or more connection-specific resources required to send the packet to the virtual host memory corresponding to the connection destination; and writing the packet to the virtual host memory. The foregoing steps may be implemented as a program or sequence of instructions within the memory 320, or on a signal bearing medium, such as the medium 340, and executed by the processor 310.

Figure 6:
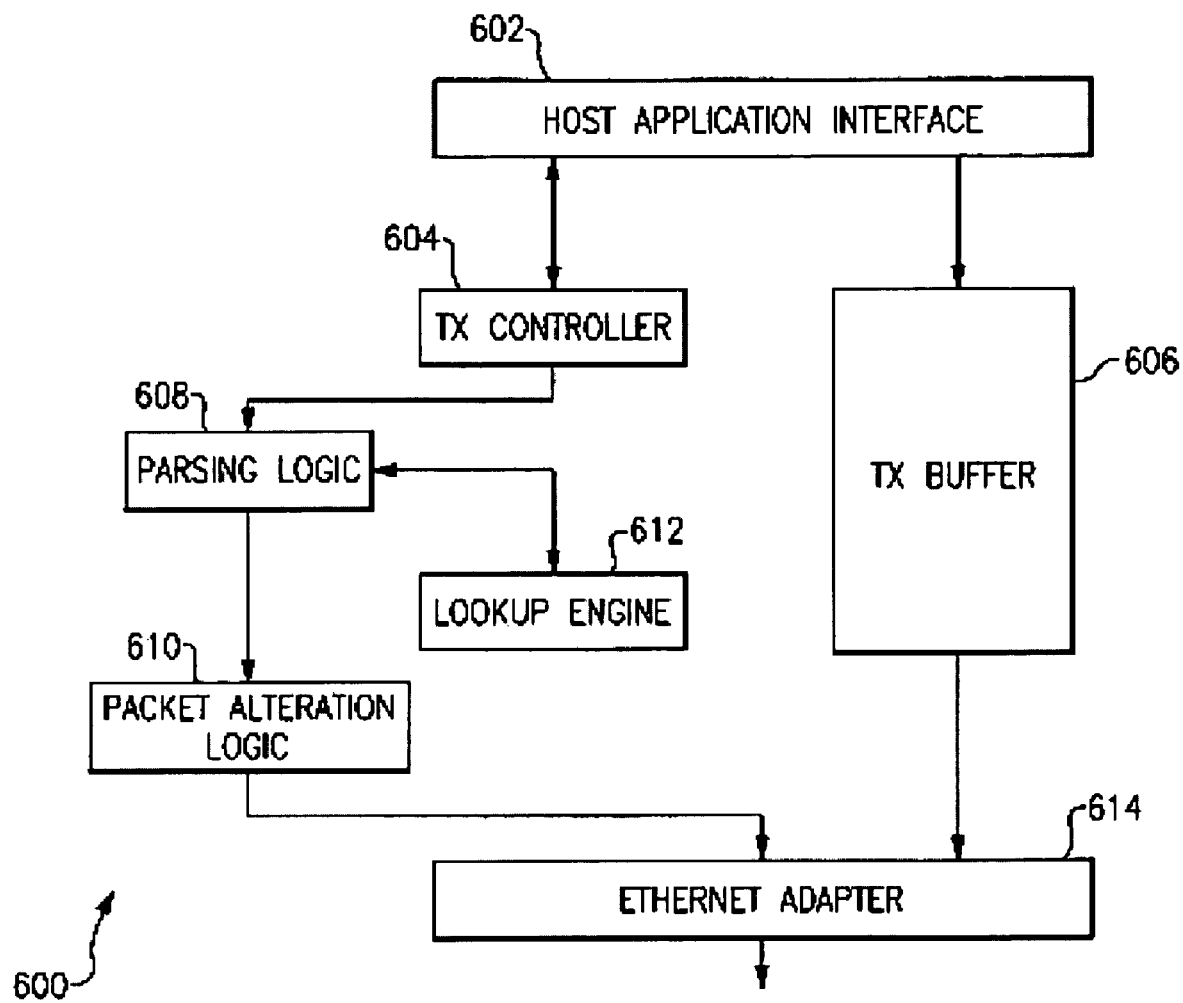
FIG. 6 is a block diagram of the outbound packet transmission system showing the packet alteration function.

FIG. 6 illustrates a system 600 configured to process outbound packet flow from a virtual host to a network in accordance with an embodiment of the present invention. A host application interface 602 provides the mechanism to allow a host operating system to interact with a transmission system. These techniques can be implemented in the router 200 of FIG. 2 above. A Tx controller logic 604 maintains the virtualized interface to a Ethernet Virtualization Router such as router 200 of FIG. 2 above. A Tx transmit buffer 606 is configured as a FIFO buffer and used to store data for transmission over the network. Parsing logic 608 is used to determine characteristics of the packet. A lookup engine 612 assists the parsing logic 608 by determining if the destination of the packet is known. Packet alteration logic 610 is used when a frame needs modification—such as a new header. Otherwise, the function of the packet alteration logic 610 is bypassed. An Ethernet adapter 614 is given pointers to assemble the outbound packet and fetches data from the transmit buffer 606 before assembling the packet and sending it to the network. Enterprise level of Ethernet virtualization includes complex filtering and routing rules, as well offloading functions that are traditionally done if software. This includes re-writing packet headers on their way to and from the virtual hosts.

Figure 7:
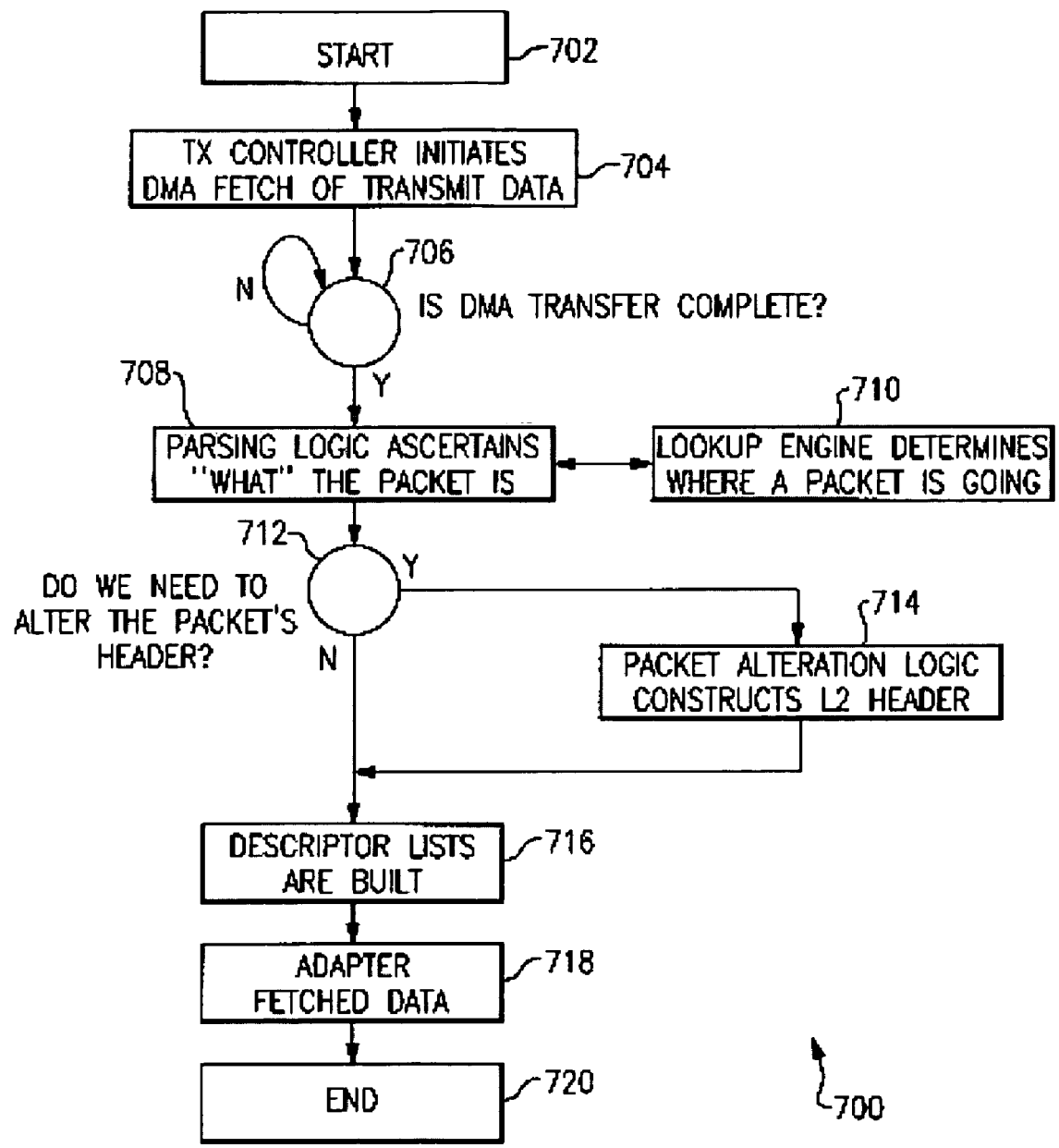
FIG. 7 is a flowchart showing the packet alteration function for outbound traffic.
Figure 8:
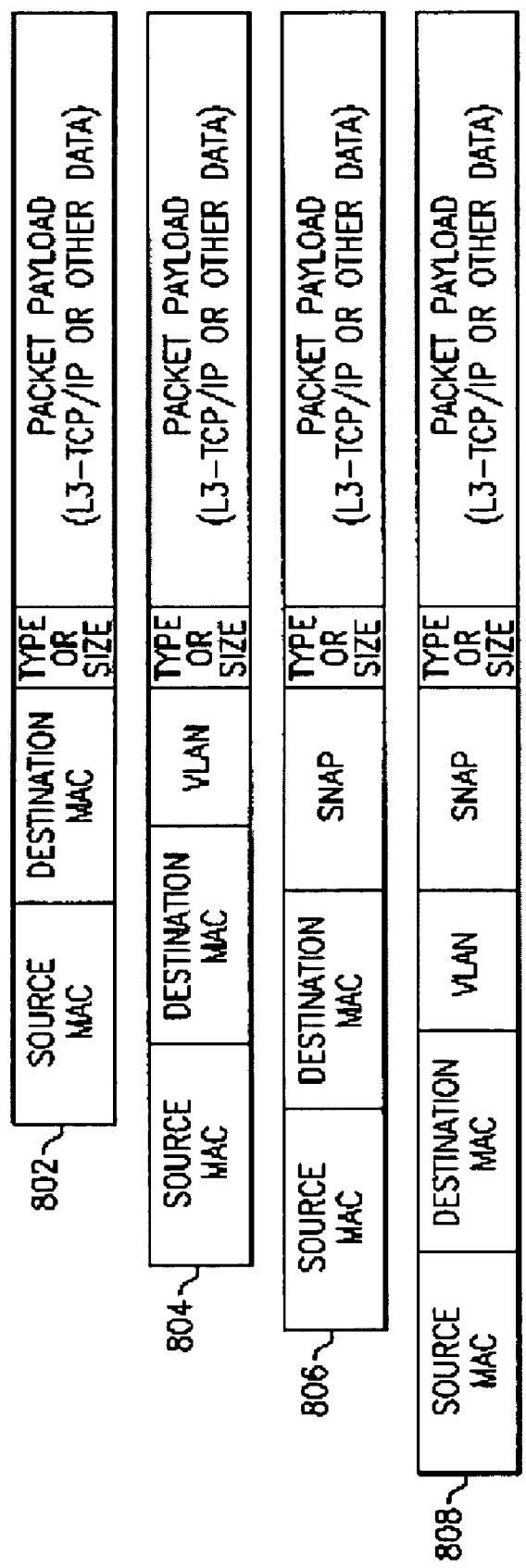
FIG. 8 is illustrates common network packet formats which may be built by alteration of packet headers.
Figure 9:
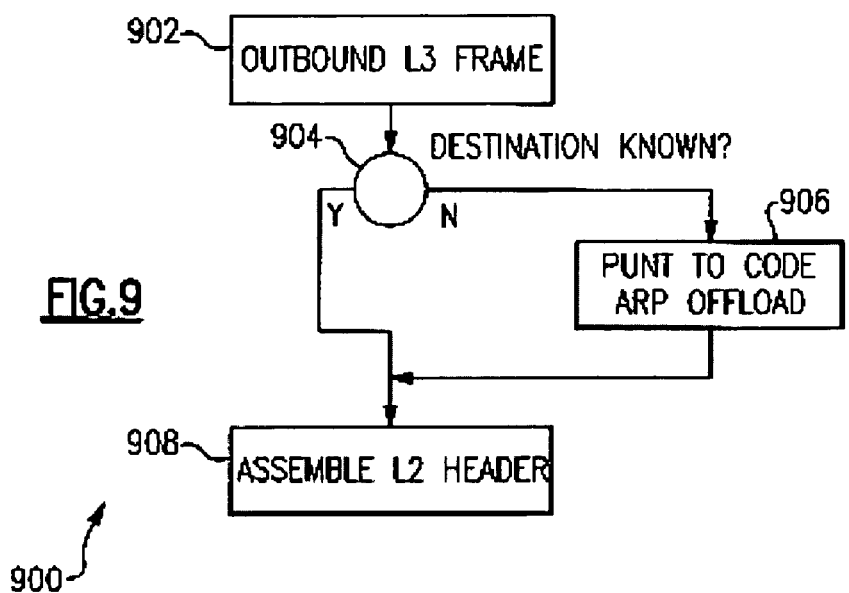
FIGS. 9 and 10 are a flowcharts illustrating network packet alteration for the purpose of automated ARP-offload processing.
Figure 10:
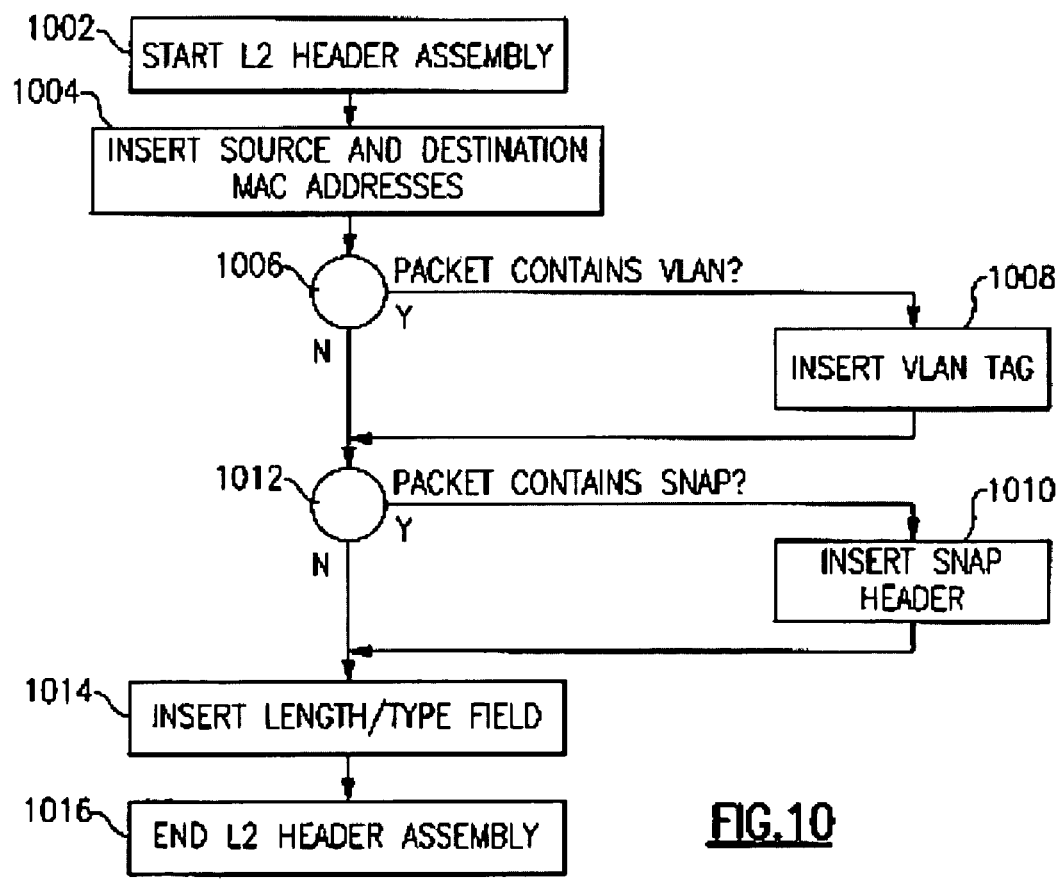

As explained below in detail, FIG. 7 shows the general flow of a packet as it flows from host memory through the Ethernet virtualization engine to the adapter. FIG. 8 illustrates typical packet formats as they are sent out of the Ethernet virtualization engine. FIGS. 9 and 10 illustrate an embodiment of the present invention used to offload the ARP function from host software.

FIG. 7 is a flowchart 700 for processing outbound traffic in accordance with an embodiment of the present invention. At block 702, processing outbound traffic begins. At block 704, the TX controller 604 initiates a DMA fetch to pull data from the host and into the transmit buffer 606. At block 706, the Tx controller check if the DMA fetch is complete. At block 708, when the DMA fetch is complete, as indicated by, for example, status registers or signals, the parsing logic 608 is called. The parsing logic 608 determines what a packet is. In addition, at block 710, the parsing logic 608 interacts with the lookup engine 612 to determine the destination of a packet. At block 712, processing proceed by checking if the host is known and whether it needs a header appended. If so, then at processing proceeds to block 714 which involves calling the packet alteration logic to construct the MAC header, also referred to as the "Layer 2" header or just "L2 header" in the diagram. L2 headers contain MAC addresses, and optionally VLAN and SNAP headers. This construction includes forming an L2 header with the necessary VLAN and/or SNAP headers. After the packet alteration logic is complete, or if the packet's header did not require modification, the adapter is given descriptors which it uses to fetch the data from the transmit buffer FIFO, as shown by block 716 and 718. The descriptors contain address/count pairs which describe the locations and lengths of the packet data and the new or modified headers. The adapter moves the headers and data onto the Ethernet network. After the adapter is finished, status is updated and this packet's transmission is finished, as shown by block 720.

FIG. 8 illustrates some packet transformations 800 in accordance with an embodiment of the present invention. As packets flow through the router it is advantageous to modify the packet and/or packet headers to facilitate ethernet virtualization and improve performance. One possible function is offloading the IP Address Resolution Protocol (ARP) function from host software. The diagram 800 represents different types of packets which can be constructed using the network packet alteration method. Traditional network nomenclature refers to the Media Access Control (MAC) layer as "Layer 2" or L2. This is used to transport a packet over the Ethernet media. The Internet Protocol (IP) layer, referred to as "Layer 3" or L3, is used to transport the packet over the internet. Packet 802 represents a conventional packet having a generic L2 header. Packet 804 represents a packet with a L2 header having a VLAN header. Packet 806 represents a packet with an L2 header and with a SNAP header and payload. Packet 808 represents a packet with an L2 header and with VLAN and SNAP headers. The source MAC address, destination MAC address, VLAN header, SNAP header, and ether-type/size fields are all constructed with the packet alteration techniques of the present application. In one embodiment these techniques can be implemented in hardware using a programmable logic device such as a field programmable gate array (FPGA), an application specific integrated circuit (ASIC) or a combination thereof. The packet payload remains the same throughout the flow. Various lookup tables can be maintained within the router to facilitate the modifications to the packet.

FIG. 9 shows a flow chart 900 of a process for an ARP offload packet in accordance with an embodiment of the present invention. At block 902, an output IP frame is received without an L2 header. At block 904, the process checks if the destination of the packet is already known. If the destination of the packet is already known, then processing proceeds to block 908 which involves assembling the L2 header If not, then block 906 is executed which involves punting (forwarding) the packet to code, which can perform the ARP offload functions. When ARP offload is completed, the destination is now known and an L2 header can be constructed as before, at block 908.

FIG. 10 is a flow chart 1000 of a process for L2 header assembly in accordance with an embodiment of the present invention. At block 1002, the process for L2 header assembly commences. At block 1004, Source and Destination MAC addresses, which begin an L2 header, are first inserted into memory by the network packet alteration method. At block 1006, the process checks if the packet contains a VLAN header. If the packet contains a VLAN header, then VLAN identifier and tag is inserted at block 1008. Similarly, at block 1012, the process checks if the packet is a SNAP frame. If the packet is a SNAP frame, then the process proceeds to block 1010 which involves inserting the SNAP header to memory. At block 1014, the length/Ethertype field is inserted. At block 1016, the L2 header is completely assembled and processing ends.

FIG. 11 shows a process 1100 for data linking to assemble altered packets in accordance with an embodiment of the present invention. In step 1, descriptors 1102 are constructed. In one embodiment, descriptors can be a scatter-gather list. Descriptors typically contain an address and a length of each portion of the data to transfer. A shown, the descriptors 1102 contain addresses, represented by the arrows, which point to data locations 1104 in the 1106 transmit buffer. The lengths of each portion of the data are represented by the shaded area in the transmit buffer, at step 2. In step 3, the adapter or network interface card fetches the data described by the descriptors. It assembles the data to form a packet 1108 that is contiguous for transmission to the network.

It should be noted that the above techniques can be used with the computer system 300 and signal bearing medium 340 of FIG. 5.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other non-transitory computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

We claim:

1. A method for implementing Ethernet virtualization, the method comprising:
   receiving from a network, by a router, a first packet destined for a virtual host on the network;
   responsive to a resource being available, the resource required to send the first packet to the virtual host corresponding to a first destination connection, writing the first packet to a virtual host memory;
   responsive to the first destination connection for the first packet not being available, passing the first packet to a store engine;
   processing, by the router, outbound packet traffic from the virtual host to the network, the processing comprising:
      allowing a host operating system to interact with a transmission system through a host application interface;
      maintaining, by a TX controller, a virtualized interface to the router;
      storing, by a TX transmit buffer, data for transmission over the network;
      determining, by a parsing logic, characteristics of a second packet;
      determining, by a lookup engine, that a second destination of the second packet is known;
      determining that packet alteration is needed;
      responsive to the second packet needing modification, implementing packet alteration logic to modify the second packet; and
      responsive to the second packet not needing modification, bypassing packet alteration;
   responsive to the second destination of the second packet being known, sending, by the router, the second packet onto the network; and
   responsive to the second destination of the second packet not being known, calling packet alteration logic to construct a header and sending the header and second packet onto the network.

2. The method of claim 1, further comprising determining by a parsing logic that the second destination of the second packet is known.

3. The method as in claim 1, wherein the resource to send the first packet comprises a waiting packet.

4. The method as in claim 1, comprising the store engine obtaining a free packet buffer from an elastic first-in, first-out (FIFO) memory and storing, by the store engine, the first packet in the free packet buffer.

5. The method as in claim 4, wherein the free packet buffer is an empty packet-sized block of memory in a local data store.

6. The method as in claim 1 further comprising:
   responsive to the second packet not needing modification, assembling, by the router, the outbound second packet; and
   sending, by the router, the second packet to the network.

7. The method as in claim 1, wherein implementing packet alteration logic comprises:
- initiating, by the TX controller, a DMA fetch to pull data from the virtual host memory and into the transmit buffer;
- checking, by the TX controller, that the DMA fetch is complete;
- responsive to the DMA fetch being complete, calling the parsing logic wherein the parsing logic determines the second packet, the second packet comprising fetched data;
- determining, by interaction of the parsing logic and the lookup engine, the destination of the determined second packet;
- checking that the second destination is known and that the second packet needs a header appended; and
- responsive to the second destination being known and the second packet needing a header appended, calling packet alteration logic to construct the header.

8. The method as in claim 1, wherein implementing the packet alteration logic further comprises:
- constructing data descriptors;
- giving the descriptors to the router for the router to use in fetching the data from the transmit buffer after the packet alteration logic is complete;
- assembling, by the router, data described by the data descriptors to form the second packet that is contiguous for transmission to the network;
- transmitting the second packet; and
- updating status of the transmission as complete.

9. The method as in claim 1, wherein bypassing packet alteration comprises:
- assembling, by the router, the second packet that is contiguous for transmission to the network;
- transmitting the second packet; and
- updating status of the transmission as complete.

10. A computer program product for implementing Ethernet virtualization, the computer program product comprising a non-transitory computer readable storage medium having computer readable program code embodied therewith, the computer readable program code configured to carry out a method, the method comprising:
- receiving from a network, by a router, a first packet destined for a virtual host on a network;
- responsive to a resource required to send the first packet to the virtual host corresponding to a first destination connection being available, writing the first packet to a virtual host memory;
- responsive to a first destination connection for the first packet not being available, passing the first packet to a store engine;
- processing, by the router, outbound packet traffic from the virtual host to the network, the processing comprising:
  - allowing a host operating system to interact with a transmission system through a host application interface;
  - maintaining, by a TX controller, a virtualized interface to the router;
  - storing, by a TX transmit buffer, data for transmission over the network;
  - determining, by a parsing logic, characteristics of a second packet;
  - determining, by a lookup engine, that a second destination of the second packet is known;
  - determining that packet alteration is needed;
  - responsive to the second packet needing modification, implementing packet alteration logic to modify the second packet; and
  - responsive to the second packet not needing modification, bypassing packet alteration;
- responsive to the second destination of the second packet being known, sending, by the router, the second packet onto the network; and
- responsive to the second destination of the second packet not being known, calling packet alteration logic to construct a header and moving the header and second packet onto the network.

11. A device for implementing Ethernet virtualization, the device comprising a router having a network connection, the device configured to carry out a method, the method comprising:
- receiving a first packet destined for a virtual host on a network;
- responsive to a resource required to send the first packet to the virtual host corresponding to a first destination connection being available, writing the first packet to a virtual host memory;
- responsive to the first destination connection for the first packet not being available, passing the first packet to a store engine;
- processing outbound packet traffic from the virtual host to the network, the processing comprising:
  - maintaining, by a the TX controller, a virtualized interface to the router;
  - storing, by a TX transmit buffer, data transmission over the network;
  - allowing, by a host application interface, the router to interact with a transmission system;
  - determining, by a parsing logic, characteristics of a second packet;
  - determining, by a lookup engine, that a second destination of the second packet is known;
  - responsive to the second packet needing modification, implementing, by the router, packet alteration logic to modify the second packet; and
  - responsive to the packet not needing modification, bypassing, by the router, packet alteration and assembling and sending the second packet to the network;
- responsive to the second destination of the second packet being known, sending the second packet onto the network; and
- responsive to the destination of the second packet not being known, calling packet alteration logic to construct a header and moving the header and second packet onto the network.

12. The device of claim 11, further comprising a parsing logic, wherein the method comprises the parsing logic determining that the destination of the first packet is known.

13. The device of claim 11, the device further comprising the store engine wherein the method comprises the store engine obtaining a free packet buffer from an elastic first-in, first-out (FIFO) memory; and storing the first packet in the packet buffer.

14. The device as in claim 11, wherein responsive to the second packet needing modification, the device further comprises:
- the TX controller, wherein the method comprises the TX controller initiating a DMA fetch to pull data from the virtual host memory and into the transmit buffer;
- the TX controller, wherein the method comprises the TX controller checking that the DMA fetch is complete and responsive to the DMA fetch being complete, the TX controller calling the parsing logic wherein the parsing logic determines the packet, the packet comprising fetched data;

interaction, by the parsing logic and the lookup engine, to determine the destination of the second packet;

the router, wherein the method comprises the router checking that the destination is known and that the second packet needs a header appended; and responsive to the destination being known and the second packet needing a header appended, the router calling packet alteration logic to construct the header.

15. The device as in claim 11, wherein responsive to the router calling packet alteration logic, the router:

constructs data descriptors;

fetches the data from the transmit buffer after the packet alteration logic is complete;

assembles data described by the data descriptors to form the second packet that is contiguous for transmission to the network;

transmits the second packet; and updates status of the transmission as complete.

16. The device as in claim 11 wherein responsive to bypassing packet alteration, the router:

assembles the second packet that is contiguous for transmission to the network;

transmits the second packet; and updates status of the transmission as complete.

\* \* \* \* \*